INVENTORS:
GEORGE S. WING
MARK E. CESSNA
BY
D. Gordon Angus
ATTORNEY.

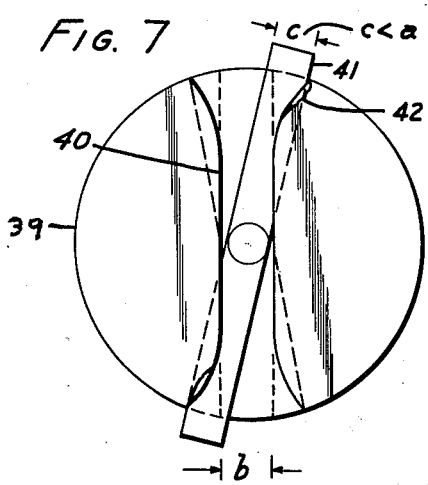
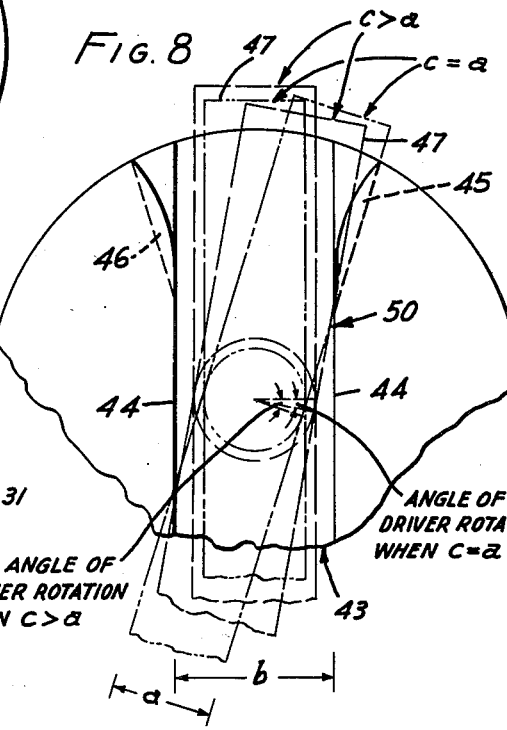
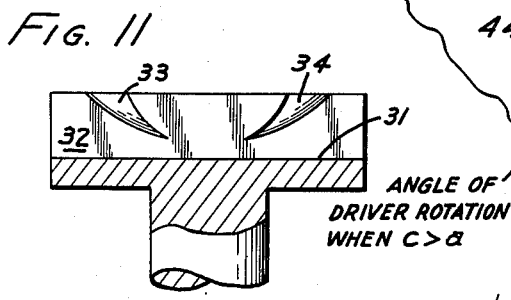
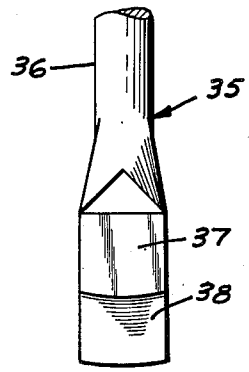
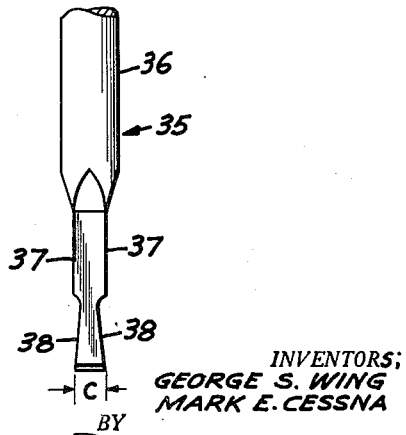
INVENTORS;
GEORGE S. WING
MARK E. CESSNA
BY
D. Gordon Angus
ATTORNEY.

United States Patent Office 2,792,039
Patented May 14, 1957

2,792,039

SLOTTED SCREW HEAD AND DRIVER THEREFOR HAVING NON-BURRING ENGAGEMENT

George S. Wing, Palos Verdes Estates, and Mark E. Cessna, Redondo Beach, Calif., assignors, by mesne assignments, to Hi-Shear Rivet Tool Company, Torrance, Calif., a corporation of California Application December 14, 1954, Serial No. 475,188

3 Claims. (Cl. 145—50)

This invention relates to fastener devices, and in particular to a method for making an undercut slot in the head of a fastener, and to a fastener incorporating said slot.

An object of the invention is to provide in a fastener head an undercut slot having wall contours capable of making a substantial surface contact with a driver which has contoured sides which match the undercut. The engaging surfaces are so disposed that twisting the driver in this undercut slot develops a component of force which tends to hold the driver in the slot. This overcomes the undesirable tendency for the driver to be forced out of the slot which is particularly noticeable when driving screws having flat-sided walls, by means of a conventional straight or tapered driver.

Another object of the invention is to provide a slot-producing method whereby the resulting slots can be manufactured to commercially practicable dimensional tolerances, while retaining the property of making a good surface contact with drivers which are also manufactured to commercial dimensional tolerances.

A slot of the general type referred to in this application is described in U. S. Patent 2,677,985 to Rudolph M. Vaughn, issued May 11, 1954. A slot manufactured according to this patent may sometimes show tendencies to form small protruding burrs when used with drivers which are somewhat undersized relative to the undercutter which generated the slot. These burrs are unsightly, spoil a clean surface, and tend to snag clothing. The slot-generating method of this invention produces a slot which minimizes this burr-forming tendency.

In accordance with the present invention a slot is generated in the head of a fastener which may for example be an ordinary screw. The fastener may if desired be of some other type which is turned in use, such as a "Dzus" fastener, for instance. This slot has at least one pair of undercut portions, one member of said pair cut in each of the slot walls, and the two members being cut at opposite ends of the slot from each other. According to the invention, this recess is generated by first providing a basic slot across the head of the fastener. This straight slot will have parallel flat sidewalls which are spaced a basic distance apart.

A feature of this invention resides in a method of undercutting portions of the walls of the basic slot by means of a rotating undercutter which has cutting edges on opposite sides thereof. These cutting edges diverge from each other toward the periphery of the cutter. The outermost ends of these cutting edges are spaced from each other by a distance less than the basic width of the slot.

In carrying out this method, the rotating undercutter is lowered into the basic slot with its axis of rotation perpendicular to the longitudinal axis of the fastener. After this introduction, the rotating cutter is twisted through a small angle while these axes are kept mutually perpendicular to each other. The cutting edges on the sides of the undercutter exert a side-cutting action on the wall of the slot, and generate undercuts therein. These undercuts will be surfaces of revolution whose axis is the axis of rotation of the cutter. If the cutting edges are straight, which is preferred, then these undercuts will be fragments of the surface of a cone. When the undercutter is twisted in one direction, a pair of undercuts is formed, the members of this pair being at opposite ends of the slot, and in opposite walls thereof, from each other. The separation of these undercuts from each other in a direction normal to the plane of the undercutter is, of course, determined by the dimensions of the undercutter. Since the undercutter is, by definition, narrower than the basic slot, then the separation of the undercuts, measured along a line normal to the plane of the undercutter in its position generating the undercut, will also be less than the basic width of the slot, and a feature of the invention resides in this lesser separation. Stated otherwise, the greatest separation of any part of the undercuts measured along the axis of rotation of the undercutter is less than the basic slot width.

A related feature resides in the use of a driver to turn the fastener, which driver has side walls for engaging the undercuts, these side walls are joined by an arcuate edge, whose width is less than the basic slot width, and is at least as great as the aforesaid separation of the undercuts.

The foregoing and other features of this invention will be fully understood from the following detailed description and the accompanying drawings, of which:

Fig. 7 is a plan view of a slotted screw head manufactured according to conventional practice being engaged by an undersized driver;

Fig. 8 is a plan view of a slotted screw head showing the relationship between the basic width of the slot, and drivers and undercutters of various widths;

Fig. 9 is a front elevation of a driver useful for driving a fastener having a slot according to the invention;

Fig. 10 is an elevation of the driver of Fig. 9; and

Fig. 11 is a cross-section of another form of slot according to this invention.

Figure 1:
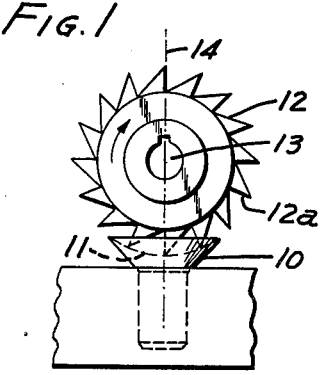
Fig. 1 is a side elevation of a screw blank held in a jig having basic slot cut in its head by a rotary cutter.

Referring to Fig. 1, there is shown a screw blank 10 of an ordinary well-known countersunk flat head type. An arcuate slot 11 is being cut across the head of the screw by means of an ordinary rotary milling cutter 12. The side-cutting teeth 12a on both sides of this cutter are parallel to each other. The center 13 of the cutter is brought straight down along the longitudinal center axis 14 of the screw blank so as to cut the slot symmetrically along a diameter of the screw head.

When cut in this manner the bottom of the screw slot will be an arcuate fragment of a cylinder, and the sidewalls will be flat and parallel to each other. These sides will be separated by the basic width of the slot. Any other desired means for forming a slot might be utilized such as conventional header machines instead of a milling cutter. Also the bottom of the slot may be other than arcuate. For example, it might be flat-bottomed as in Fig. 11.

Figure 4:
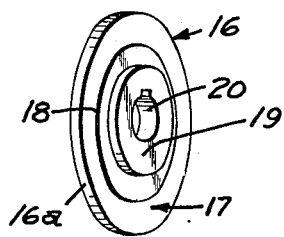
Fig. 4 is a perspective view of a blank from which the undercutter shown in Fig. 2 is made.
Figure 5:
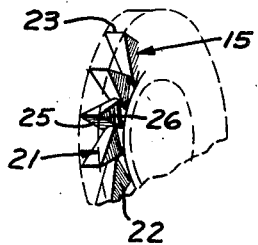
Fig. 5 is a perspective view showing part of an undercutter made from the blank of Fig. 4.

A suitable undercutter 15, a fragment of which is shown in Fig. 5, is conveniently made from the blank 16 of Fig. 4. This blank 16 has two similarly-shaped sides, and a cylindrical periphery 16a, which sides and periphery have straight-line generators. The side surfaces 17 are frusto-conical and diverge from each other toward the periphery of the blank. Curved surfaces 18 join the frusto-conical surfaces 17 with central disc-like portions 19. A keyed hole 20 at the center of the blank is provided so that the device may be mounted to a driven shaft.

Figure 3:
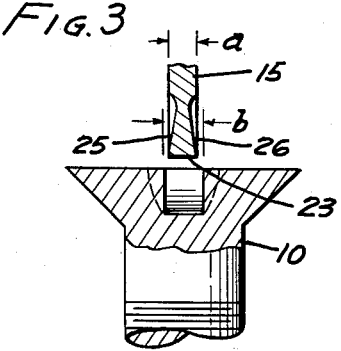
Fig. 3 is another elevation view partly in cross-section taken at line 3—3 of Fig. 2.

The undercutter of Fig. 5 (partly shown in cross-section in Fig. 3) is created by cutting suitable portions from the blank 16. Teeth 21 are made by notching the periphery, and grinding flat portions 22 on each side of the blank. This grinding and notching creates transverse cutting edges 23 extending parallel to the axis 24 of the undercutter, and also leading undercutting edges 25, 26, which diverge from each other toward the periphery of the undercutter. These leading undercutting edges 25, 26 have straight edges. The outer ends of these leading edges are interconnected by the transverse cutting edges which transverse edges are shown in the drawings as having a length $a$. It will be appreciated that the leading undercutting edges 25, 26 lie on the original surface 17 of the blank 16, and are, in effect, coincident with the generators of the side surfaces 17.

Having in mind the shape of the undercutter, and the nature of its cutting edges, the properties of the undercuts can now be understood. It will be appreciated that before using this undercutter, a slot with parallel side walls has already been formed in the head of the fastener. This "basic" straight-sided slot has a basic slot width $b$. According to this invention, the length $a$ of the transverse edges 23 of the undercutter (that is, the separation of cutting edges 25 and 26) is smaller than $b$.

The undercutter with transverse cutting edges of width $a$ is lowered into the straight slot in a position of symmetry with said slot, in substantially the same position as the cutter 12 was held while it machined the basic slot. When the undercutter is inserted in this manner, none of its edges will cut, since they do not make contact with any part of the head of the fastener in this position. After the undercutter has been inserted in the slot, either the fastener or the rotating undercutter is rotated or turned through a small angle $\theta$. This rotation is accomplished while holding the axis of rotation 24 of the undercutter perpendicular to the longitudinal axis 14 of the fastener. The angle of twist may conveniently be about 7½°, in either or both directions from the central position, but it will be understood that a few degrees more or less would not depart in principle or effect from the invention. Twisting in one direction causes the cutting edges 25, 26 to generate a pair of undercut portions, one portion belonging to a given pair being disposed in each wall. The member portions of each pair are disposed at the opposite side of the slot center from each other. The axis of rotation 24 of the cutter when in the undercutting position is the common central axis of the members of the pair of undercut portions being cut at that time. These undercuts are surfaces of revolution. It will be understood that only one pair of undercut portions will be formed at a time, and that when there are two pairs, there will be two separate axes of rotation 24, one for each pair of undercut portions. The axes 24 in that case will make an angle $2\theta$ with each other. Thus, the undercut portions in opposite walls and at the opposite ends of the slot from each other have a common axis, and each pair has a different common axis from the other pair, when there are two pairs.

Figure 2:
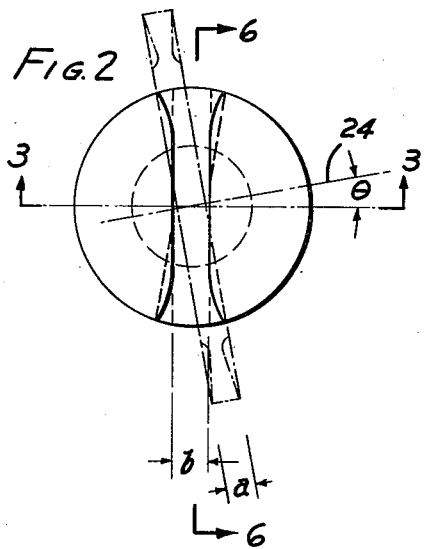
Fig. 2 is a plan view of the slotted head of the screw of Fig. 1, illustrating the making of special additional cuts, in accordance with the invention.

The slot has a transverse axis which may be considered a line in plan view, such as line 6—6 in Fig. 2. This transverse axis is perpendicular to the longitudinal axis 14 of the fastener. Otherwise stated, this transverse axis could also be defined as a plane which includes the longitudinal axis 14, the plane being in a central position in the slot. The term "transverse axis" as used herein is intened to designate the center line of the slot when shown in plan view.

Twisting in both directions generates two pairs of said undercut portions. Then two oppositely disposed undercut portions will be cut in each wall of the slot. The undercutter is preferably twisted through the angle $\theta$ in both directions so as to generate undercut portions on all four outer ends of the slot walls so that the same gripping effect between slot wall and driver can be obtained when the fastener is turned in either direction. It will be understood, however, that the generation of a single pair of undercuts by turning the cutter in a single direction produces a slot according to the invention.

In Fig. 2 the undercutter 15 is shown twisted through an angle $\theta$ so as to generate undercut portions on opposite walls of the slot. These undercut portions will have the surface generated by the leading undercutting edges 25, 26, and will therefore be frusto-conical. More exactly, they will be fragments of a conical surface of revolution, and this surface will be the same as the frusto-conical surface 17 of the blank 16.

The undercut portions are, in effect, coincident with the frusto-conical surfaces generated by the undercutting leading edges 25, 26 or, stated otherwise, of surfaces 17 of blank 16. They therefore have the same spacing from each other, measured normally to the plane of the undercutter in its undercutting position, as the surfaces generated by the rotation of the undercutting leading edges 25, 26. Members of a pair of undercut portions generated simultaneously are therefore separated by a distance which is less than the basic width of the slot. That is to say, the maximum separation measured along the central axis of the surfaces of revolution of which the undercut portions are fragments, is less than the basic slot width. Stated another way, the greatest distance from one of the undercut portions of a pair to an extension of the other undercut portion of the same pair, measured parallel to the central axis of the surfaces of revolution, is less than the basic slot width.

Figure 6:
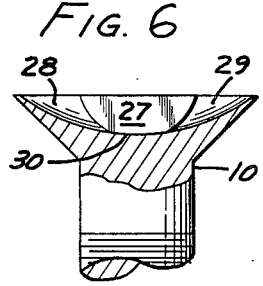
Fig. 6 is an elevation partly in cross-section taken at line 6—6 of Fig. 2.

The nature of the undercut is further illustrated in Fig. 6 in which there is shown the flat central segment 27 remaining from the operation which formed the straight sides of the slot, and the undercut portions 28, 29 which are generated by the leading edges 25, 26 of the undercutter. Obviously, undercut portions in the same wall are cut by the same set of undercutting leading edges, but the undercut portions in the same wall are members of different pairs of undercut portions, and are formed at different times when the undercutter is in a different position. Thus, Fig. 6 shows only one wall of the slot. It will be understood that the other wall of the slot will be similar to the wall which is shown. It will be noted that these undercut fragmentary frusto-conical regions will intersect with the bottom 30 of the slot when the milling cutter 12 has the same diameter as the undercutter 15. These undercut portions in the same wall are entirely separated from each other and do not meet.

In Fig. 11 there is shown an optional embodiment of a slotted head screw according to this invention in which a basic flat-bottomed slot 31 of width $b$ was formed according to conventional heading practices. Parallel flat side walls 32 are formed by this means.

An undercutter 15 having a width $a$ of its transverse cutting edges 23 which is less than the basic width $b$ of the straight slot 31 has been operated as described above to generate undercut portions 33, 34 in the wall. These portions 33, 34 will be spaced from each other in the same fashion as the undercut portions 28, 29 of Fig. 6, and will have the same geometrical properties, except that they do not necessarily intersect with the flat bottom.

In Figs. 9 and 10 there is shown a driver 35 useful to turn a fastener having a slot according to the present invention. This driver has a shank 36 which may be attached to any desired handle means. The shank has a lower end 37 which is a fragment of the blank of Fig. 4. As will be seen from the drawings, there are provided substantially flat upper regions 37, and lower tapered regions 38, these latter being fragments of frustoconical surfaces. The generators of these surfaces are straight lines which diverge from each other toward the end of the driver. The width of the end of the driver is denoted as $c$.

Fig. 7 illustrates a dimensional situation which sometimes arises when a screw slot is manufactured in the manner shown in the aforementioned Vaughn Patent 2,677,985. According to the practice of that patent, the basic slot and the undercutter have the same width; that is $a=b$. In fact, the undercutter is used to generate the basic slot according to that patent. In using the fastener, if the dimensions of the driver can be held to the same dimensions as the cutter which generated the slot, a perfect fit will result between the driver and the driver-engaging undercut portions.

However, the screw slot and also the drivers are intended for mass manufacture, and it will be recognized that certain dimensional tolerances must be provided. Therefore, in general, the driver 41 shown in outline in Fig. 7, must have tolerances which guarantee that the driver can always be inserted in the slot. That is, there must be no possibility that the driver will ever be wider than the screw slot itself. Therefore the driver will be designed to the same width or narrower than the lower limit of the width of the basic slot. When tightening the fastener with this narrower driver, it has been found that occasionally a burr 42 will be pried up at the outer edges of the slot. This occurs because the initial contact between the driver and the undercut portions will occur at the outer edge and end of the slot where the fastener material is thin and more easily crushed than at the more central and deeper parts of the slot walls. The burr which is formed represents the failure of part of the wall material, enabling the driver and the undercut portions to make increased surface contact. Since the failure occurs at the outer end of the slot where the material is thin, the burr protrudes above the top of the screw, and is objectionable on that account, as it forms a snag, and also mars the cleanness of a surface.

In Fig. 8 there is shown a slot according to this invention which substantially eliminates the possibility of such a protruding burr. A slot 43 with straight sides 44 is shown with undercut portions 45, 46 which were formed by an undercutter 47 having a width $a$ less than the distance $b$ between the straight sides of the slot. This will be recognized as the slot of Fig. 6.

It will now be seen that the slot 43 has a width $b$ at the center of the fastener head which is the limiting width as respects the driver inasmuch as it is the narrowest part of the generated slot. A driver of greater width cannot be inserted therein. Therefore only a driver having a width $c$ which is equal to or less than dimension $b$ can be inserted into the slot. It will be recalled that this width $b$ is greater than the width $a$ of the undercutter which generated the undercut portions.

An examination of Fig. 8 showing the surface contact between the surface cut by an undersized undercutter and a driver which is oversized relative to the cutter; that is where $b>c>a$, reveals that first contact will be made at the junction of the undercut and the center flat portion shown as point 50, rather than at the outer end of the slot. Therefore the driver cannot initially be turned through the full angle $\theta$. Some material near the center will then crush in order for the driver to fit perfectly. The resulting burr forms at the center, and most likely near the bottom of the slot. This preserves the smoothness of the upper surface and does not raise an objectionable sharp burr on the head. Most of the displaced metal moves to the center of the slot at the bottom thereof.

When the width $c$ of the arcuate outer edge of the driver exactly equals the "greatest distance" from one of the undercut portions of a pair to an extension of the undercut portion of the same pair measured parallel to the said central axis 24 (this "greatest distance" being the dimension $a$ of the cutter which generated the undercut portions), then the side walls of the driver will be in full surface contact with the undercut portions, and the central axis 24 of the undercut portions engaged by the driver and the central axis of the driver will be colinear. When $bca$ and the slot walls crush to provide full surface contact with the driver, then again, the said axes of the driver and undercut portions will be colinear. If the slot wall material does not crush enough to give completely full surface contact, the said axes although not precisely colinear, will be substantially colinear because such slight angle as remains between them will ordinarily be unimportant or negligible.

The following is a table showing some relative sizes of the slot and driver dimensions:

| Case | Basic Slot width $b$ | Undercutter width $a$ | Driver Point width $c$ |
| --- | --- | --- | --- |
| A | .115+.002 −.001 Mean .1155 | .110+.001 −.002 Mean .1095 | .111+.001 −.001 Mean .111 |
| B | .076+.002 −.001 Mean .0765 | .072+.002 −.001 Mean .0725 | .074+.000 −.003 Mean .0735 |

It will be observed from the above table of dimensions that the width of the undercutter's transverse cutting edges $a$ must always be less than the width of the basic slot. That is, the width of the undercutter with maximum positive tolerance will be less than the width of the basic slot with maximum negative tolerance.

The driver's width $c$ will be between the value of the basic width and of the undercutter width. It must always be less than the minimum slot width, or it cannot be inserted therein, and it will preferably be equal to or somewhat greater than the minimum undercutter width for the reasons discussed above. However, without serious effect, the driver may be made slightly narrower than the undercut slot, as in Case A of the table, where the undercutter may at an extreme be .111 and the driver at an extreme be .110, or in Case B of the table, where the undercutter can be .074, and the driver .071. However, it is to be understood that these are extreme values, and that the mass-produced items will tend to average out to the more desirable dimensions close to the middle of the tolerance range. A study of the mean values given above will indicate that the desirable driver width lies between the width of the basic slot and the width of the undercutter.

This relationship between the dimensions of the slot width and the separation of the undercuts alleviates the dimensional restraint between the relative widths of the driver and the basic slot. This allows a new degree of freedom in tool and product design, and the driver and slot width can be manufactured to commerical tolerances. Thus it is possible to manufacture screw heads in which the slot tolerances might tend to produce a somewhat narrower slot, and in which a driver might have a somewhat greater width, than would be desirable for slots and drivers when the slots are produced by the technique shown in the aforementioned Vaughn patent.

Furthermore, the possibility of producing a protruding burr when tightening the fastener is reduced. A slotted screw head generated in this manner, when its walls fail at all, will fail in a more desirable fashion so the failed material moves to a location beneath the top of the fastener to produce the increased surface area contact between the driver and the slot walls.

This invention is not to be limited to the embodiments shown in the drawings and described in the description, which are given by way of example and not of limitation, but only in accordance with the scope of the appended claims.

We claim:

1. In combination a screw head and a driver for the screw head; said screw head having a longitudinal axis, a slot with a transverse axis perpendicular to said longitudinal axis, said slot having a curved bottom, and having opposed walls, each wall with a central portion at the slot center, said central portions being separated from each other by a basic slot width, a pair of undercut portions in said walls, each of said undercut portions being a fragment of a surface of revolution, one undercut portion of said pair being disposed in each wall at the opposite side of the slot center from each other, the portions in said pair having a common central axis, the said portions intersecting the bottom of the slot, each of the said undercut portions intersecting the top of the fastener head so as to form an intersection therewith which diverges away from the transverse axis as it extends toward the edge of the fastener, the greatest distance from one of said undercut portions of a pair to an extension of the other undercut portion of the same pair measured parallel to said central axis being at the said intersection of the bottom and the undercut portions, and being less than the basic slot width, said driver comprising a driving portion with an arcuate edge of substantially the same curvature as the last-mentioned intersection and of a width at said edge which is less than the basic slot width, and which is at least as great as the said greatest distance, said side walls comprising surfaces of revolution diverging from each other toward said edge and having substantially the same configuration as said fragments, and having a common axis of revolution which is substantially colinear with said central axis of the undercut portions when the driving portion is in said slot with its surfaces of revolution in substantially full surface engagement with said undercut portions.

2. A combination according to claim 1 in which the said intersection of the undercut portions and the bottom are circular arcs having a radius, and in which the edge of the driver is circular, having the same radius as the last-mentioned intersection.

3. A combination according to claim 1 in which the said bottom has a cylindrical portion, and in which the edge of the driver is cylindrical, and the radii of the cylindrical portion and of the driver cylinder are equal.

References Cited in the file of this patent

UNITED STATES PATENTS

| | | |
|---|---|---|
| 2,142,185 | Fieg | Jan. 3, 1939 |
| 2,238,960 | Wilcox | Apr. 22, 1941 |
| 2,377,114 | Tomalis | May 29, 1945 |
| 2,592,462 | Phipard | Apr. 8, 1952 |
| 2,677,985 | Vaughn | May 11, 1954 |
| 2,745,120 | Vaughn | May 15, 1956 |

FOREIGN PATENTS

| | | |
|---|---|---|
| 10,612 | Germany | Aug. 20, 1880 |